Aug. 20, 1974　　　H. S. HUGHES　　　3,830,897
METHOD OF FORMING HOUSING STRUCTURES
Filed Jan. 20, 1972　　　　　　　4 Sheets-Sheet 1
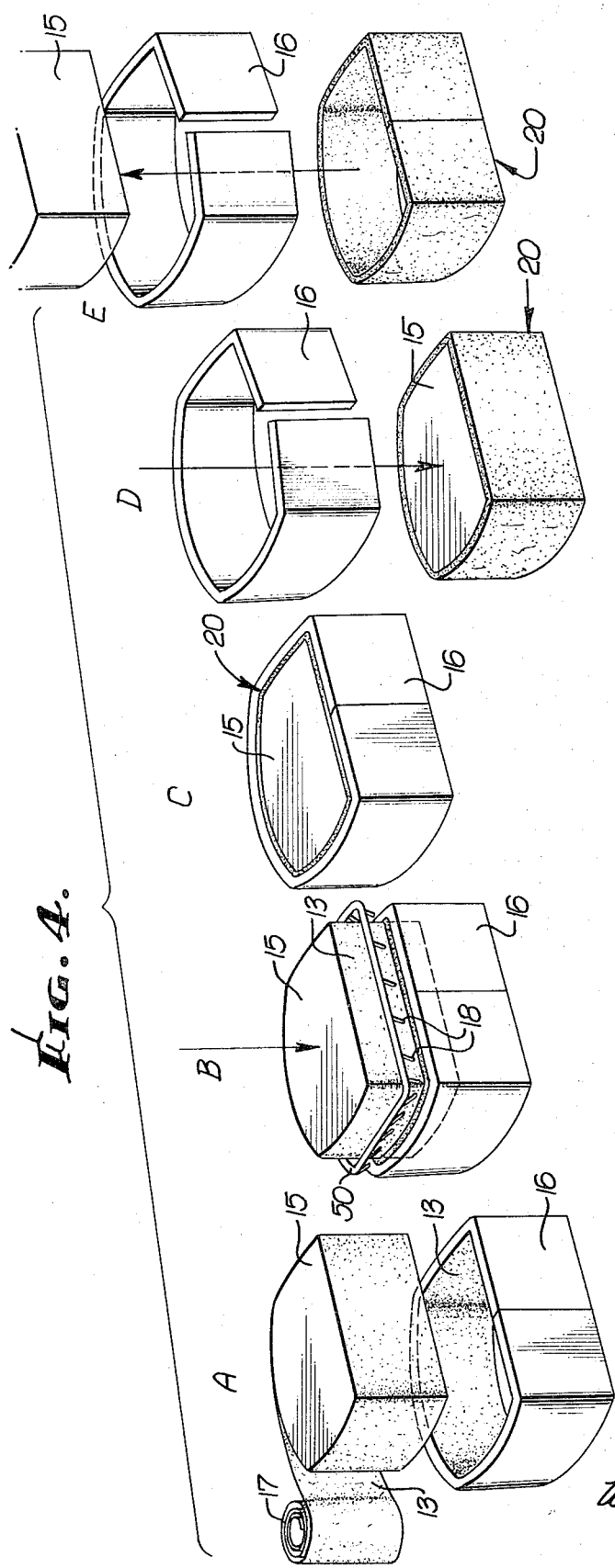
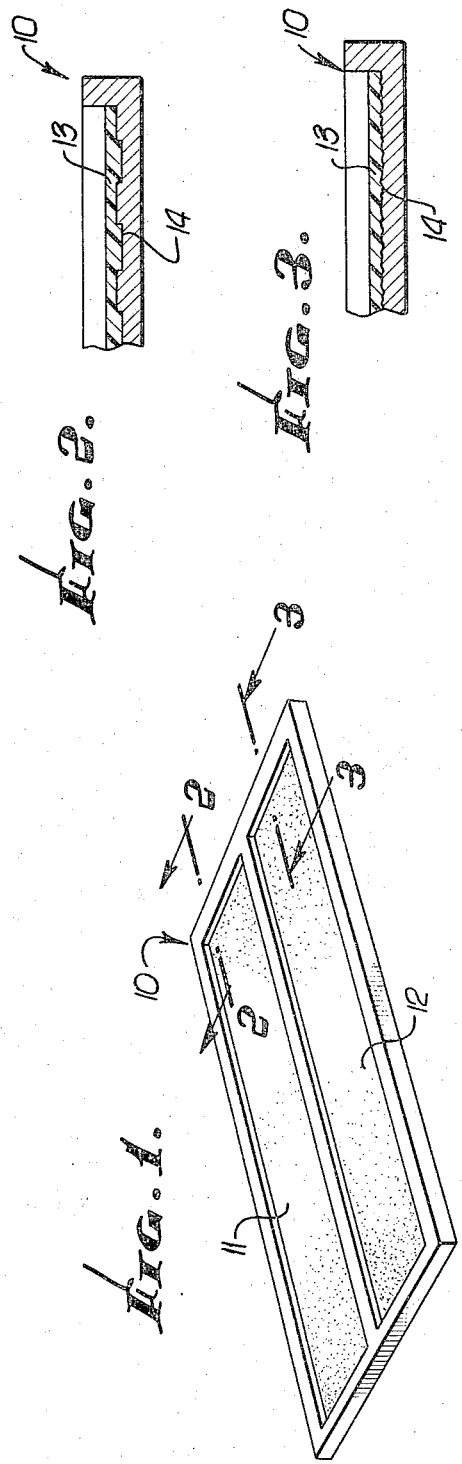
INVENTOR.
HENRY S. HUGHES
BY
White, Haefliger, & Bachand
ATTORNEYS.

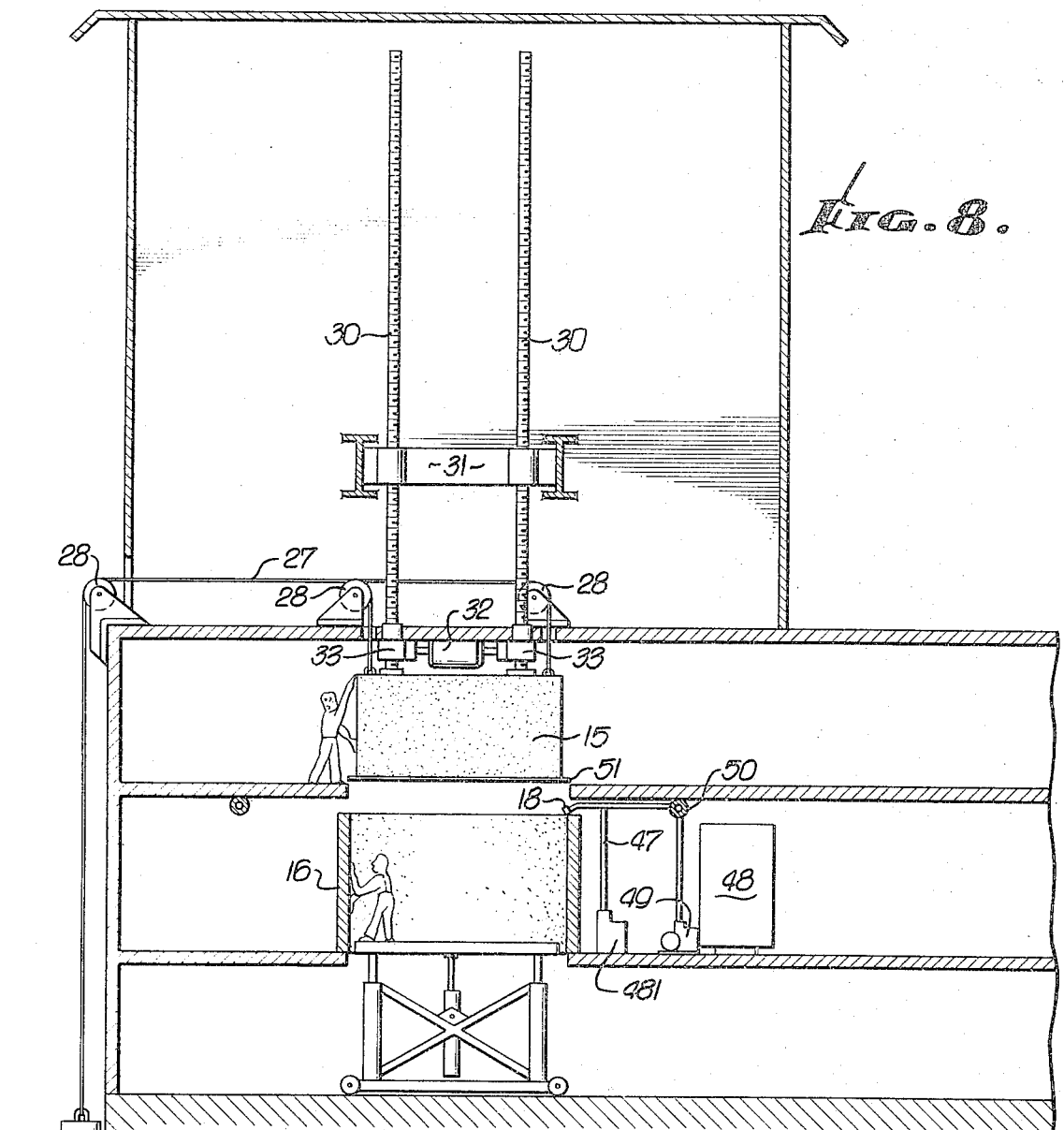
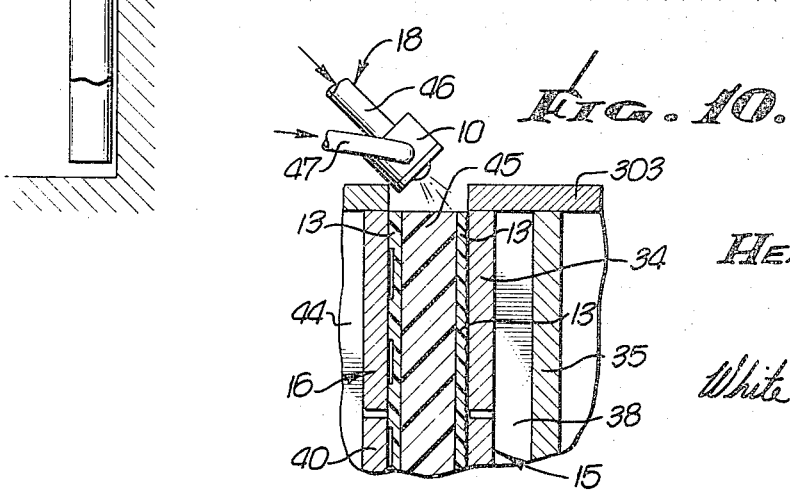

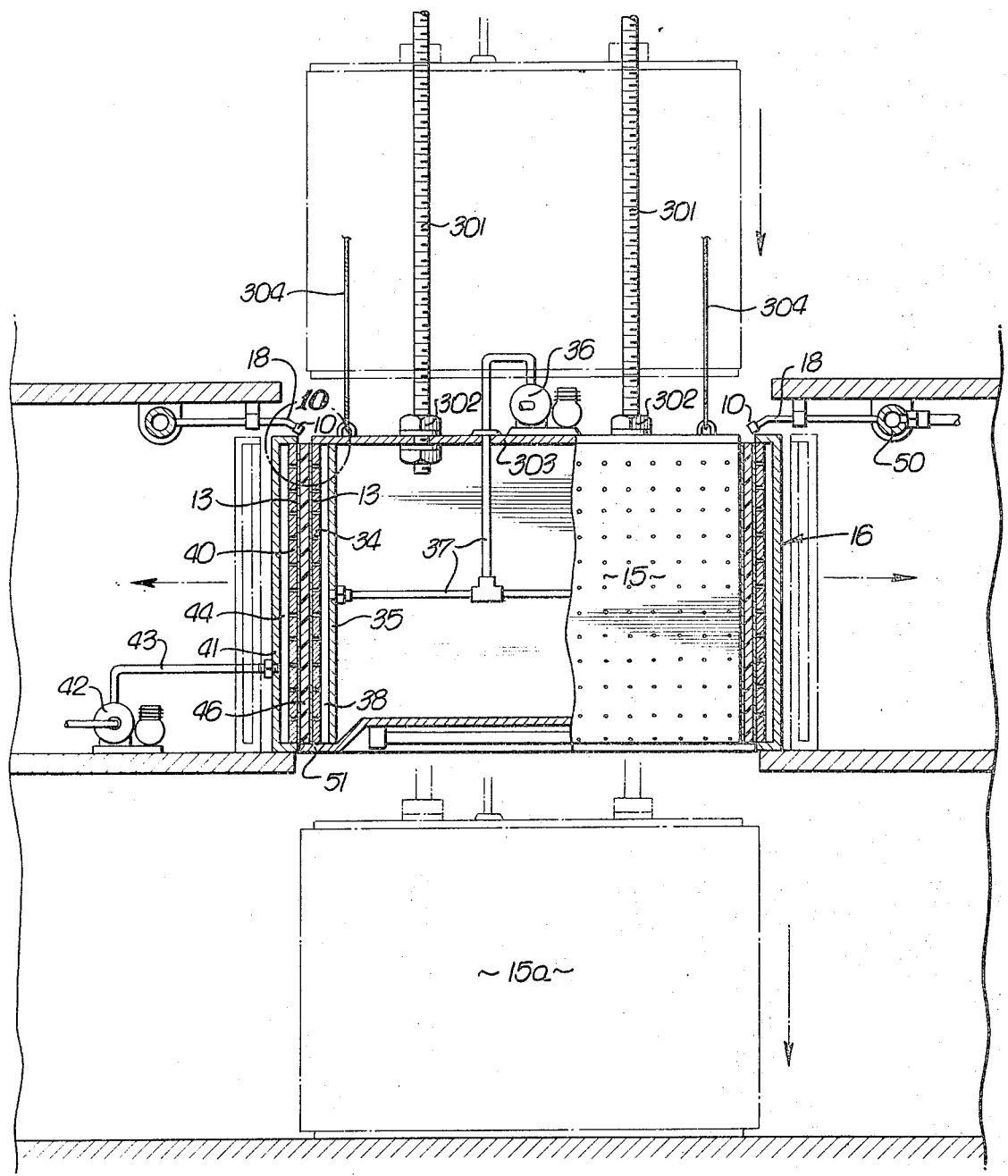

United States Patent Office 3,830,897
Patented Aug. 20, 1974

3,830,897
METHOD OF FORMING HOUSING STRUCTURES
Henry S. Hughes, Belmont, Calif., assignor to
Lee T. Bordner, Los Angeles, Calif.
Continuation-in-part of abandoned application Ser. No.
40,756, May 27, 1970. This application Jan. 20, 1972,
Ser. No. 219,291
Int. Cl. B29d 27/00
U.S. Cl. 264—45
19 Claims

ABSTRACT OF THE DISCLOSURE

Building structures are formed by a method employing a male mold section lowered into a female mold section, both sections carrying spaced preformed skin members between which solidifiable urethane foam-forming composition or other cellular material is delivered as the male section is lowered, following which the structure so formed is removed from the mold sections.

REFERENCE TO RELATED APPLICATION

This application is a continuation-in-part of my copending application, Ser. No. 40,756, filed May 27, 1970 now abandoned.

BACKGROUND OF THE INVENTION

As has become generally recognized, economic and practical considerations have pointed to the need for and benefits of lower cost housing in the general prefabricated category. Currently, conditions have stimulated the quest for good low cost constructions to the extent that many different proposals are being considered and tested both competitively and on individual merits, as well as adaptabilities to single and multiple unit structures. Consistent with acceptable construction, the primary considerations are lowered costs.

SUMMARY OF THE INVENTION

The present invention has in common with other current proposals the objective of quality housing production by prefabrication techniques that are primarily responsible for low costs of the completed structures. However, the invention departs from all practices of which I am aware in the preformation means and methods employed to achieve structurally and aesthetically superior housing units and assemblies.

The invention contemplates formation of the units as molded structures by a new method employing the steps of:

1. Forming surface textured skin or untextured members or sheets ultimately to present the inside and outside surfaces of the unit.

2. Applying the skin members in spaced relation to the outside and inside respectively of relatively vertically movable male and female mold sections.

3. Lowering the male mold section within the female section and introducing bonding filler material into the space between the skins progressively as the male section is lowered.

4. Opening the female mold section and removing the formed unit for any necessary curing of the filler material and further fabrications.

In reference to these individual steps and operations, while broadly it is contemplated that the skin members may be derived from any suitable source and that they may be of any composition appropriate to their particular uses for the purposes of the invention, preferably the skins are preformed by molding a flowable, e.g. resinous or plastic, material in essentially sheet form within horizontally positioned molds, all as will later appear.

As to the step 2 application of the skin members to the male and female mold sections, the latter being relatively stationary may permit simpler mounting of its respective skin member to the inside of the section. However, if found desirable or necessary, adherence of the skins to either or both of the mold sections may be facilitated by communication of suction to the skins through the mold section. Also if necessary or desirable, separation of the skins from the sections may be facilitated by communication of positive pressure in a manner reversing the communication of suction.

In step 3 the filler material broadly contemplated may be selected from any of various compositions capable of having bonding unity with the skin members and usually to have at least ultimately light weight or cellular physical state. Such material should have initial flowability or fluidity and be capable of filling the inter-skin spaces. Typical filler materials, as hereinafter more fully disclosed, may be resinous in character or in the category of cementitious light weight or porous compositions. Preferably the filler is urethane monomer capable of polymerization by a catalyst introduced with the monomer to the inter-skin space to produce a solidified foam which monolithically integrates the formed unit.

In the final step following the introduction of a filler such as urethane foam that may require further curing, the formed unit after removal from the molds may be allowed such time as is required for the cure, after which the unit is in condition for such further fabrications as joinder to other similar units, association with foundation or other supports, and installation of windows, wiring, fixtures and the like depending upon the requirements for a particular unit.

The foregoing as well as additional features and objects of the invention will be better understood without further preliminary discussion from the following detailed description of illustrative procedures and production equipment shown by the accompanying drawings.

BRIEF DESCRIPTION OF THE DRAWINGS

FIG. 1 is a view illustrating diagrammatically a mold pair that may be used in preforming the skin members;

FIGS. 2 and 3 are enlarged fragmentary cross sections on lines 2—2 and 3—3 of FIG. 1;

FIG. 4 is a diagrammatic sequence view illustrative of thet steps employed in the molding of a structural unit;

FIG. 8 is a diagrammatic showing of illustrative equipment for performing the molding operation, the male mold section appearing in a elevated position;

FIG. 9 is a similar view of a variational form showing the male section lowered into the female mold; and FIG. 10 illustrates one of the nozzle assemblies for delivering a foam-forming filler into the spaces between the skin members at the completion of the mold travel.

DESCRIPTION OF THE PREFERRED EMBODIMENTS

Figure 6:
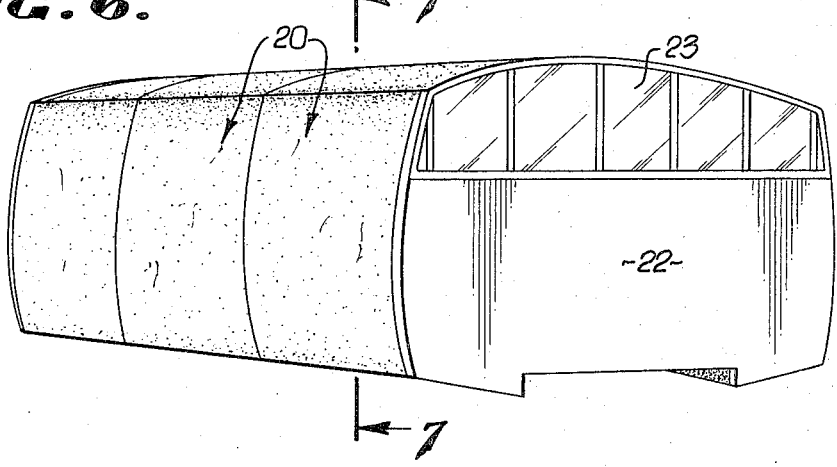
FIG. 6 is a perspective showing of an illustrative multi-section building structure.

Referring first to FIGS. 1 to 3, the skin members unless otherwise derived, may be formed in a shallow mold generally indicated at 10 shown to have areas 11 and 12 to receive the materials to be molded and which may form respectively the inner and outer exposed surfaces of the production unit. Preferably the material to be formed in the mold 10 will be of resinous or plastic composition initially having such fluidity as to assume by reason of horizontal positioning of the mold assembly an essentially uniform thickness as illustrated in FIGS. 2 and 3. Preparatory to the skin molding the mold sections may be conditioned for reusable surfaces by spraying them with a suitable material, e.g. Teflon or a silicone, which will allow the formed skins to freely separate from the mold. As will be understood, the skins may be internally reinforced as by added fiber or woven glass fabric to impart to the skins such strength as may be found necessary ultimately and in the course of the unit molding operation.

The skins 13 thus formed at a thickness of say 3/16" may or may not have predetermined surface irregularities corresponding to the mold irregularities 14 to give textured surface appearances appropriate to the inside and outside of the final molded product. Also preferably the skins have such flexibilities as will permit them to be applied to multiple sides of the unit-forming mold sections.

Referring to FIG. 4, the unit forming mold assembly is shown to comprise an inner initially elevated male section 15 and a lower stationary female section 16 to both of which the preformed flexible skin 13 may be applied as from roll 17. Thus the skin first is applied about the male section 15 and inside the female section 16, the molds being proportioned so as to provide for spacing of the applied skins when the male section is lowered into the female section. In FIG. 4 initial positioning of the mold sections is illustrated at Stage A and the partially lowered male section at Stage B which also shows to be associated with the molds, manifold feed nozzles 18 for the delivery of the filler material to the inter-skin spaces between the sections as the male section is lowered.

In Stage C the male section has been fully lowered into the female section and the molded unit shell generally indicated at 20 is in condition for removal from the mold assembly from which the shell is separable by opening the female section at 21, see Stage D. Stage E is illustrative of the elevated male mold section from the female section and the freed unit 20.

Figure 7:
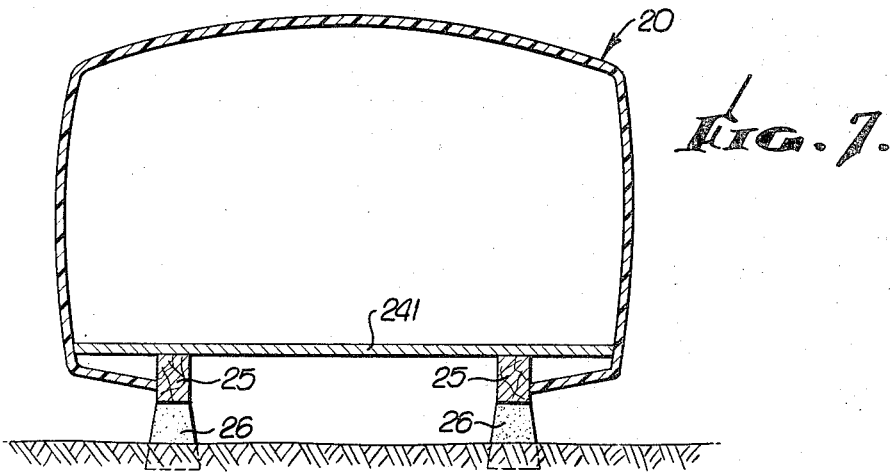
FIG. 7 is a cross section on line 7—7 showing additionally a floor and foundation support for the structure.
Figure 5:
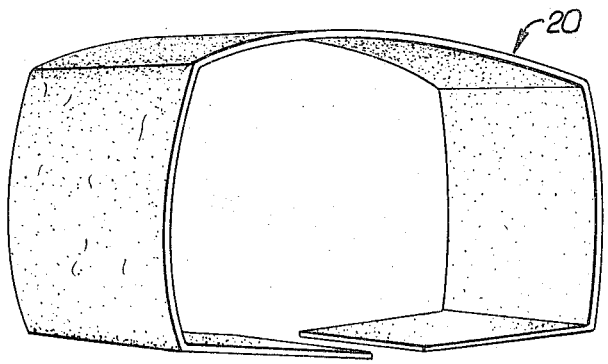
FIG. 5 is illustrative of the formed unit positioned for further fabrications.

FIG. 5 illustrates the molded unit positioned bottom down for further fabrications, and FIGS. 5 to 7 show an illustrative housing structure formed by weather-proof joinder of a series of the units 20 and with which suitable end closures may be associated, such as wall 22 having windows 23. For purposes of a FIG. 6 assembly, the structure may contain a sectional floor 241 supported on beams 25 and a foundation 26 both running the length of the structure.

The equipment and techniques illustrated in FIGS. 8 to 10 are to be regarded merely as illustrative of any of different forms of apparatus usable in the unit molding operation. Here the equipment is shown to comprise as support for the upper mold section 15, cables 27 running over sheaves 28 from counterweight 29. Initially the mold section is elevated as shown to permit the application of one of the skins continuously about and to at least three sides of the section. Simultaneously or sequentially the lower section 16 is lined to similar extent with the second skin for outside exposure. In FIG. 8 the upper section lowering equipment is shown to comprise a pair of screws 30 bearing against the cable supported section and rotatable within a threaded stationary guide support 31, the screws being driven by motor 32 by way of transmissions 33 in driving association with the screws.

Though generally similar to FIG. 8, FIG. 9 represents certain variational features such as the male mold suspension and the provision for vacuum and pressure communications through the mold sections for adherence of the skin members and subsequently for separation of the formed unit from the molds. Here the male section 15 is shown to be suspended by rods 301 bolted at 302 to the top wall 303 of the section, cables 304 also being used in the suspension. As illustrated, the male mold section may be lowered through the female mold to the broken line position 15a. Adherence of the skin to section 15 may be favored by forming the section as a perforated shell 34 and a spaced imperforate wall 35 so that vacuum may be communicated from pump 36 and pipes 37 to space 38. Similarly the female mold section may include an inner perforated shell 40 spaced from outer shell 41 for communication of vacuum from pump 42 through line 43 to space 44. Suction thus communicated to the skins will facilitate their retention on the mold surfaces and promote uniformity in the width of the inter-skin space to which the filler material 45 is to be delivered.

Typically, fluid monomeric filler material, e.g. urethane monomers, is delivered to the space from manifold branch 46 together with catalyst from line 47 as particularly illustrated in FIG. 10. As illustrated in FIG. 4 the nozzle locations should be sufficiently close together to assure uniformity in delivery of the filler composition to the spaces about the mold sections. As illustrated in FIG. 8 the monomer may be delivered from container 48 by pump 49 to manifold 50 and the nozzles 18 overlying the space to be filled, together with catalyst from tank 481.

In the molding operation mold section 15 is lowered progressively into the lower section 16 while simultaneously urethane and catalyst are delivered into the space between the skins.

As is generally known, the fluid filler such as urethane monomer is convertible to foam by the addition of foaming agents to progressively fill the inter-skin space until the upper mold section bottoms within the lower section, see FIG. 10. In order to prevent possible flow of foam filler out from the bottom of the lower mold the upper section 15 may carry suitable means such as rigid or flexible barriers 51 which seal against the lower mold surface. The result at this stage is the formation of foam filler 46 bonded to the skins to form a monolithic unit shell. In the use of urethane filler, the resin may require time to set or cure into a suitably rigid foam, and as previously described, removal of the formed unit may be followed by time allowance for curing as at Stages D and E in FIG. 4.

In further reference to the molding operation, separation of the skins from their respective mold surfaces may be facilitated by reverse pressure communications to the mold spaces 38 and 44, i.e. by positive pressures tending to free the skins from adherence to their respective molds. The shell 20 is then in condition for joinder to other similar formed units and the installation of flooring, other walls and fixtures in accordance with predesign. As to the inside and outside exposures, the respective skins will have been preformed with appropriate surface configurations or designs.

As will be evident from the foregoing, in the production of the present housing structures, a filler material is encased within skin material.

Materials useful as fillers comprises substances which can be filled between the skins and which thereafter set up to integral or monolithic masses of considerable rigidity. Flowable cementitious, ceramic and cellulosic materials may be used. Other suitable filler materials are synthetic organic polymers which are solid at room temperatures (e.g. 25° C.). These polymers may be flowed into the interskin space through the application of heat to the polymer as with thermoplastic polymers, or by the use of polymer precursors, i.e. one or more reactive monomers capable of forming polymer by the application of heat or pressure with or without a catalyst for the reaction, to the precursors within the interskin space, or by the use of solvents for the filler material components which are not solvents for the skin material and which may be readily removed during fabrication. Among suitable thermoplastic synthetic organic polymers, there may be mentioned olefin polymers i.e. polymers and copolymers of ethylene, propylene, butene, styrene and vinyl monomers i.e. monomers having the characteristic $$>C=C<$$

grouping and specifically illustrative of those are polyethylene; polypropylene; ethylene/propylene copolymer; polystyrene, ethylene/styrene copolymer, styrene/butadiene copolymer, styrene/methyl methacrylate copolymer, styrene/acrylonitrile copolymer; poly(vinyl chloride) poly (vinyl acetate), ethylene/vinyl chloride copolymer; acrylonitrile/butadiene/styrene, as well as polymers and copolymers of acrylic acid such as poly(methyl methacrylate), ethylene/acrylic acid copolymer, polyamides such as the various nylons, and the like.

Among suitable thermosetting synthetic organic plastic materials there may be mentioned acetals i.e. polymers and copolymers of formaldehyde, such as Delrin and Celcon; alkyds, copolymers of polyols and dibasic acids, allyl esters of dibasic acids such as phthalic, isophthalic and maleic acids; amino resins such as urea-formaldehyde and melamine formaldehyde resins; epoxy resins such as the glycidyl ether of 2,2-bis (4-hydroxyl phenyl) propane, glycidated novolac or epoxy novolac resins, and tetraphenylol ethane-epichlorohydrin resin, as well as epoxidized olefins such as bis (2,3-epoxycyclopentyl) ether and vinylcyclohexene dioxide; phenolic resins such as phenolformaldehyde resolves and novolacs; polyesters produced by the esterification condensation of dihydric alcohols and dicarboxylic acids, e.g. products of the reaction of saturated or unsaturated acids or acid anhydrides e.g. maleic anhydride, fumaric acid, phthalic anhydride, isophthalic acid or adipic acid with propylene glycol or diethylene glycol; furanes e.g. furfuraldehyde phenolics, furfuryl alcohol polymers and furfuryl alcohol-modified urea formaldehyde resins, and polyurethanes, products prepared by the reaction of a polyisocyanate e.g. toluene diisocyanate with a polyether, polyester, oil, glycol, amine, carboxylic acid or water, e.g. particularly polyethers such as propylene oxide adducts of sorbitol, sucrose, diamines, pentaerythritol, and methyl glycosides.

It is desirable to minimize polymer consumption in producing the filler and so foamed fillers are particularly advantageous. Accordingly, foamed polyurethane, cellulose acetate, phenolic, and urea-formaldehyde resins, polystyrene, styrene/acrylonitrile copolymer, silicone resin, polyvinyl chloride, polyethylene, and epoxy resins are particularly preferred as fillers. Typical foaming agents include volatile liquids, e.g. aliphatic hydrocarbons containing $C_5$ to $C_7$ isomers e.g. pentane, neopentane, hexane, isohexane, heptane, isoheptane, aromatic hydrocarbons having up to 7 carbon atoms e.g. benzene and toluene; aliphatic halogenated hydrocarbons such as methylene chloride, dichloroethane, dichlorotetrafluoroethane, trichlorofluoro methane and trichlorotrifluoroethane; as well as solid blowing agents such as azo compounds, e.g. azobisformamide, azobisisobutyronitrile and diazoaminobenzene; N-nitroso compounds e.g. N,N'-dimethyl-N,N'-dinitrosoterephthalamide; and sulfonyl hydrazides e.g. benzenesulfonylhydrazide, toluene - (4) - sulfonyl hydrazide, benzene-1,3-disulfonyl hydrazide, and the like.

In addition, the filler material may include one or more of flame retardants, colorants, antistats, anti-sag and thickening agents, all as well known in the art.

The foregoing filler materials may contain reinforcing aids such as glass, asbestos or metal fibers or extenders such as sawdust.

These filler materials are filled between the mold sections as explained above, the mold sections being covered by preformed skin members. The skin members may comprise sheet material preformed and configured about the mold or material formed in situ, i.e. on the mold.

Useful materials for skin members include the foregoing synthetic organic polymeric materials having a molecular weight enabling formation of sheet therefrom either prior or conforming to the mold sections or in situ on the mold sections. The skin material may be metallic, e.g. aluminum or steel foils, cellulosic e.g. paper or paperboard, fibrous either woven or nonwoven, where the fibers are inorganic e.g. metallic or glass, cellulosic, e.g. rayon and wood fiber, synthetic organic e.g. fibers formed from one or more of polymeric materials listed above, or combinations of these materials e.g. glass or metal fiber reinforced polyester or polyurethane resin, or polyethylene-aluminum laminates. The skin members may be extruded into sheet and suitably cut and/or shaped to fit the mold sections, vacuum preformed into the desired mold section configuration, or painted, sprayed or otherwise coated into the mold sections (over a suitable release coat if necessary). Skin member thicknesses may vary, but generally will exceed 10 mils and be less than three inches, but may be up to ten inches in thickness for extremely large sections.

I claim:

1. The method of forming a housing structure wall that comprises applying relatively thin skin members comprising metallic, cellulosic, or synthetic organic polymeric sheet material ultimately for inside and outside exposure to a pair of interfitting spaced mold sections one of which is initially elevated relative to the other section while supporting the skin members in spaced relation, lowering the elevated section into the lower section to define an interskin space, flowing a structural filler material, between the mold sections and into said interskin space and against the skin members progressively as the elevated mold section is lowered, said filler material comprising a flowable synthetic organic polymeric material capable of bonding unity with the skin members and of setting up into a rigid mass, in bonding relation to said skin members.

2. The method of claim 1, in which said material is a thermosetting synthetic organic polymer.

3. The method of claim 1, in which said polymeric material is cellular in the set condition.

4. The method of claim 1, in which one of said skin members has preformed exposable surface texturing.

5. The method of claim 1, in which said mold sections include a male section externally carrying one of said skin members and receivable within a hollow female section lined with the other skin member.

6. The method of claim 5, in which said skin members are formed in situ on said mold sections.

7. The method of claim 5, in which pressure differential is communicated through the female mold section to the skin member thereon.

8. The method of claim 7, in which said pressure differential communication is through apertures in the surface of the female section.

9. The method of claim 8, in which vacuum is communicated through said apertures.

10. The method of claim 8, in which positive pressure is communicated through said apertures.

11. The method of claim 5, in which the mold sections are generally rectangular in horizontal cross section and said skin members are applied to at least three side surfaces of each of the sections.

12. The method of claim 11, in which the skin members faces of each of the sections.

13. The method of claim 5, in which the male mold section is lowered from elevated position into the female section.

14. The method of claim 5, in which said filler material is porous.

15. The method of claim 5, in which said filler material comprises a synthetic organic polymeric foam.

16. The method of claim 5, in which the filler material introduced to the space between the mold sections comprises liquid urethane polymer precursor and catalyst for the hardening thereof into a monolithic mass.

17. The method of claim 16, in which the urethane and catalyst are continuously introduced during substantially continuous lowering of the male section within the female section.

18. The method of claim 17, in which after said space is filled the female mold section is opened for removal of the formed structure and curing of the urethane foam filler.

19. The method of claim 18, in which said skin sections are formed by solidification of a liquid synthetic organic polymeric material on said mold sections.

References Cited

UNITED STATES PATENTS

| | | | |
|---|---|---|---|
| 2,642,920 | 6/1953 | Simon et al. | 264—45 X |
| 3,155,751 | 11/1964 | Morris | 264—45 |
| 3,258,511 | 6/1966 | McGregor | 264—45 |
| 3,258,861 | 7/1966 | Niconchuk | 264—45 X |
| 3,277,220 | 10/1966 | Plymale et al. | 264—45 |
| 3,381,999 | 5/1968 | Steere | 264—45 X |
| 3,627,162 | 12/1971 | Dossin | 264—45 X |
| 3,630,819 | 12/1971 | Conger | 264—45 X |

H. S. COCKERAM, Primary Examiner

U.S. Cl. X.R.

161—161; 296—1; 264—DIG 57, DIG 67, DIG 77, DIG 78

UNITED STATES PATENT OFFICE
CERTIFICATE OF CORRECTION

Patent No. 3,830,897          Dated August 20, 1974

Inventor(s) H.S. Hughes

It is certified that error appears in the above-identified patent and that said Letters Patent are hereby corrected as shown below:

column 6, line 59 delete "faces of each" and insert therefore -- are applied to all four sides --

Signed and sealed this 19th day of November 1974.

(SEAL)
Attest:

McCOY M. GIBSON JR.             C. MARSHALL DANN
Attesting Officer              Commissioner of Patents